United States Patent
Li et al.

(10) Patent No.: US 10,367,615 B2
(45) Date of Patent: Jul. 30, 2019

(54) ACCESS POINT AP, STATION STA, COMMUNICATIONS SYSTEM, AND DATA TRANSMISSION METHOD

(71) Applicant: Huawei Technologies Co., Ltd., Shenzhen (CN)

(72) Inventors: Bo Li, Xi'an (CN); Xiaoya Zuo, Xi'an (CN); Xueli Kong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 43 days.

(21) Appl. No.: 15/675,355

(22) Filed: Aug. 11, 2017

(65) Prior Publication Data

US 2017/0346608 A1 Nov. 30, 2017

Related U.S. Application Data

(63) Continuation of application No. PCT/CN2015/072815, filed on Feb. 11, 2015.

(51) Int. Cl.
*H04L 5/00* (2006.01)
*H04W 72/04* (2009.01)
(Continued)

(52) U.S. Cl.
CPC .............. *H04L 5/003* (2013.01); *H04L 67/32* (2013.01); *H04W 72/04* (2013.01);
(Continued)

(58) Field of Classification Search
CPC ... H04B 7/0452; H04B 7/0417; H04W 74/08; H04W 72/04; H04W 72/0446; H04L 5/003; H04L 67/32

See application file for complete search history.

(56) References Cited

U.S. PATENT DOCUMENTS

| 2009/0010275 A1 | 1/2009 | Diepstraten et al. |
| 2012/0230317 A1 | 9/2012 | Kim et al. |

(Continued)

FOREIGN PATENT DOCUMENTS

| CN | 104125046 A | 10/2014 |
| CN | 104254136 A | 12/2014 |

OTHER PUBLICATIONS

Machine Translation and Abstract of Chinese Publication No. CN104254136, Dec. 31, 2014, 35 pages.
(Continued)

*Primary Examiner* — Benjamin H Elliott, IV
(74) *Attorney, Agent, or Firm* — Conley Rose, P.C.

(57) ABSTRACT

A data transmission method includes sending, by a master station (STA), a request to send (RTX) to an access point (AP) in a same basic service set (BSS), which includes the AP and multiple STAs, and the master STA is a STA that is the first to obtain a channel by contention in the multiple STAs, instructing a surrounding STA to determine, according to conditions, whether to follow the master STA to send an RTX, where a STA following the master STA to send the RTX satisfies conditions that the STA has buffer data to be transmitted, the STA is in the same BSS as the master STA, and a power of a signal received from the master STA is greater than a preset threshold, and receiving response information from the AP to transmit uplink data on a specified sub-channel.

20 Claims, 11 Drawing Sheets

(51) Int. Cl.
*H04W 74/08* (2009.01)
*H04L 29/08* (2006.01)
*H04B 7/0452* (2017.01)

(52) U.S. Cl.
CPC ....... *H04W 72/0446* (2013.01); *H04W 74/08* (2013.01); *H04B 7/0452* (2013.01)

(56) References Cited

U.S. PATENT DOCUMENTS

| | | | |
|---|---|---|---|
| 2013/0223382 A1 | 8/2013 | Abraham et al. | |
| 2013/0229996 A1* | 9/2013 | Wang | H04W 72/0413 370/329 |
| 2013/0286959 A1* | 10/2013 | Lou | H04W 72/04 370/329 |
| 2014/0269544 A1 | 9/2014 | Zhu et al. | |
| 2014/0328191 A1 | 11/2014 | Barriac et al. | |
| 2016/0050693 A1 | 2/2016 | Yang et al. | |
| 2016/0330663 A1* | 11/2016 | Zhou | H04W 4/025 |
| 2017/0346608 A1* | 11/2017 | Li | H04W 72/04 |

OTHER PUBLICATIONS

Foreign Communication From a Counterpart Application, PCT Application No. PCT/CN2015/072815, English Translation of International Search Report dated Nov. 5, 2015, 2 pages.
Foreign Communication From a Counterpart Application, PCT Application No. PCT/CN2015/072815, English Translation of Written Opinion dated Nov. 5, 2015, 8 pages.
Lou, H., et al., "Multi-User Parallel Channel Access for High Efficiency Carrier Grade Wireless LANs," XP032632036, 2014 IEEE International Conference on Communications, Jun. 10, 2014, pp. 3865-3870.
Foreign Communication From a Counterpart Application, European Application No. 15881510.0, Extended European Search Report dated Jan. 16, 2018, 16 pages.

* cited by examiner

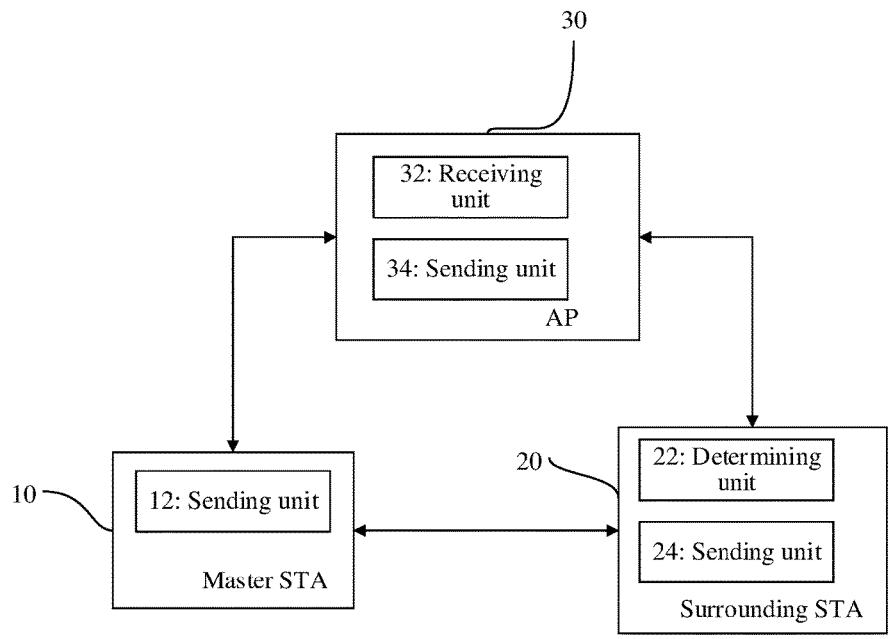

FIG. 17

| S21 | A STA obtaining at least one channel by means of contention in a BSS sends an RTX, or sends an RTX when the STA obtains, by means of listening, an RTX sent by another STA obtaining at least one channel by means of contention, and the other STA satisfies following conditions, where the BSS includes an AP and multiple STAs, the following conditions include the STA has buffer data to be transmitted, the STA is in a same BSS as a master STA, and a power of a signal received from the master STA is greater than a preset threshold |

| S22 | The STA sending the RTX receives response information sent by the AP to transmit data on a sub-channel specified in the response information |

FIG. 18

ACCESS POINT AP, STATION STA, COMMUNICATIONS SYSTEM, AND DATA TRANSMISSION METHOD

CROSS-REFERENCE TO RELATED APPLICATIONS

This application is a continuation of International Patent Application No. PCT/CN2015/072815 filed on Feb. 11, 2015, which is hereby incorporated by reference in its entirety.

TECHNICAL FIELD

The present disclosure relates to the communications technologies, and in particular, to an access point (AP), a station (STA), a communications system, and a data transmission method.

BACKGROUND

In 802.11 specifications, one AP and multiple STAs associated with the AP constitute a basic service set (BSS).

In a BSS, an uplink multiuser data transmission method includes that on a single channel or multiple channels, after an AP sends a trigger frame, after a time of Short Interframe Space (SIFS), if the channel is idle, a STA randomly selects a sub-channel to send a request to send (RTX) to contend for access. After the RTX is received, after a time of SIFS, the AP sends a clear to send (CTX) message to the STA on a whole channel to schedule the STA to transmit data on a specific sub-channel. After the AP sends the CTX, after a time of SIFS, the STA sends uplink data on an allocated sub-channel, and then after a time of SIFS, the AP replies with an acknowledgement message on the whole channel. However, the uplink multiuser data transmission method has the following disadvantages: 1) Because before a Trigger frame is used to schedule multiple users, an AP does not know which users have uplink data, a problem of "triggering without response" exists; 2) when a STA performs uplink data transmission, multiple STAs distributed relatively broadly in geographic positions may perform access in parallel, causing a problem of interference diffusion; 3) an effect of "proximity" exists, and relatively complex power control may be needed.

Another uplink multiuser data transmission method is on a single channel or multiple channels; all STAs listen to channels and back off independently, and after backing off, randomly select sub-channels to send RTXs to contend for channel access. After an AP receives the RTX, after a time of SIFS, the AP sends CTXs to the STAs on a whole channel to schedule the STAs to transmit data on specific sub-channels. After the AP sends the CTXs, after a time of SIFS, the STAs send data on allocated sub-channels, and then after a time of SIFS, the AP replies with an acknowledgement message on a whole channel. However, the uplink multiuser data transmission method can hardly resolve a problem of RTX sending synchronization between STAs, causing a problem of mutual interference between multiple channels and reducing the uplink access efficiency.

SUMMARY

The present disclosure provides an AP, a STA, a communications system, and a data transmission method to resolve problems of triggering without response and interference diffusion.

The present disclosure provides a STA, including a sending unit configured to send a first RTX when the STA obtains at least one channel by means of contention, or send a third RTX when the STA obtains, by means of listening, a second RTX sent by another STA obtaining at least one channel by means of contention, and the other STA satisfies following conditions, where the following conditions include the STA has buffer data to be transmitted, the STA is in a same BSS as the STA obtaining at least one channel by means of contention, and a power of a signal received from the STA obtaining at least one channel by means of contention is greater than a preset threshold, and a receiving unit configured to receive response information sent by an AP, where the response information can be used to schedule the STA to transmit data on a specified sub-channel.

The present disclosure further provides an AP, including a receiving unit configured to receive an RTX sent by a master STA in a same BSS as the AP, where the master STA is a STA obtaining at least one channel by means of contention in the BSS, receive an RTX sent by a follower STA of the master STA, where the follower STA satisfies conditions as follows: the follower STA has buffer data to be transmitted, the follower STA is in the same BSS as the master STA, and a power of a signal received from the master STA is greater than a preset threshold, and a sending unit configured to send response information after the requests to send sent by the master STA and the follower STA of the master STA are received, to schedule the master STA and the follower STA of the master STA to transmit data on specified sub-channels.

The present disclosure further provides a communications system, including a master STA obtaining at least one channel by means of contention in a BSS, where the master STA includes a sending unit configured to send an RTX, a surrounding STA capable of obtaining, by means of listening, the RTX sent by the master STA, where each surrounding STA includes a determining unit configured to determine whether the surrounding STA satisfies following conditions of following the master STA to send an RTX, and the following conditions include the surrounding STA has buffer data to be transmitted, the surrounding STA is in the same BSS as the master STA, and a power of a signal received from the master STA is greater than a preset threshold, and each surrounding STA further includes a sending unit configured to send an RTX when the surrounding STA satisfies the following conditions, and an AP in the same BSS as the master STA, where the AP includes a receiving unit and a sending unit, the receiving unit of the AP is configured to receive the requests to send sent by the master STA and the follower STA of the master STA, and the sending unit of the AP is configured to send response information, to schedule the master STA and the follower STA of the master STA to transmit data on specified sub-channels.

The present disclosure further provides a data transmission method, including sending, by a STA obtaining at least one channel by means of contention in a BSS, an RTX, or sending an RTX when the STA obtains, by means of listening, an RTX sent by another STA obtaining at least one channel by means of contention and the other STA satisfies following conditions, where the BSS includes an AP and multiple STAs, the following conditions include the STA has buffer data to be transmitted, the STA is in a same BSS as a master STA, and a power of a signal received from the master STA is greater than a preset threshold, and receiving, by the STA sending the RTX, response information sent by the AP to transmit data on a sub-channel specified in the response information.

The present disclosure further provides a data transmission method, including receiving an RTX sent by a master STA in a same BSS as an AP, where the master STA is a STA obtaining at least one channel by means of contention in the BSS, receiving an RTX sent by a follower STA of the master STA, where the follower STA satisfies conditions as follows: the follower STA has buffer data to be transmitted, the follower STA is in the same BSS as the master STA, and a power of a signal received from the master STA is greater than a preset threshold, and sending response information after the requests to send sent by the master STA and the follower STA of the master STA are received to schedule the master STA and the follower STA of the master STA to transmit data on specified sub-channels.

The present disclosure further provides a data transmission method, including sending, by a master STA obtaining at least one channel by means of contention in a BSS, an RTX, determining, by a surrounding STA obtaining, by means of listening, the RTX sent by the master STA, whether the surrounding STA satisfies following conditions of following the master STA to send an RTX, where the following conditions include the surrounding STA has buffer data to be transmitted, the surrounding STA is in the same BSS as the master STA, and a power of a signal received from the master STA is greater than a preset threshold, sending, by the surrounding STA satisfying the following conditions, an RTX, and sending, by an AP in the same BSS as the master STA, response information, to schedule the master STA and the follower STA of the master STA to transmit data on specified sub-channels.

Embodiments of the present disclosure provide an uplink data transmission method, and an AP and a STA thereof. In the method provided in the present disclosure, a STA obtaining a channel by means of contention instructs a STA satisfying conditions in surrounding STAs to perform parallel access, and the STA following the STA to perform access is a STA having a buffer service to be transmitted such that a problem of "triggering without response" can be avoided, and the STA following the STA to perform access is in a same BSS as an initiating STA such that interference diffusion can be avoided and an interference range can be reduced.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

FIG. 17 is a composition diagram of a communications system according to Embodiment 6 of the present disclosure;

FIG. 18 is a flowchart of a data transmission method according to Embodiment 7 of the present disclosure;

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Technical solutions of the present disclosure may be applied to an orthogonal frequency division multiplexing (OFDM) system, such as a wireless local area network (WLAN) system, especially WI-FI. Certainly, the method in embodiments of the present disclosure may be applied to an OFDM system of another type, and this is not limited herein in the embodiments of the present disclosure.

To facilitate understanding of the embodiments of the present disclosure, first, several elements to be introduced in description of the embodiments of the present disclosure are described herein.

An AP is a wireless switch used in a wireless network and is also a core of the wireless network. A wireless AP is an AP for a mobile computer user to enter a wired network and is mainly used in a broadband family, inside buildings, and inside parks, a typical coverage distance is tens to hundreds of meters, and a current main technology is 802.11 series. An AP is equivalent to a bridge that connects a wired network and a wireless network, and a main function thereof is connecting wireless network clients together and then connecting a wireless network to the Ethernet.

A STA is any wireless terminal device, such as a computer onto which a wireless network interface card is installed or a smartphone with a WI-FI module.

Figures 1, 2:
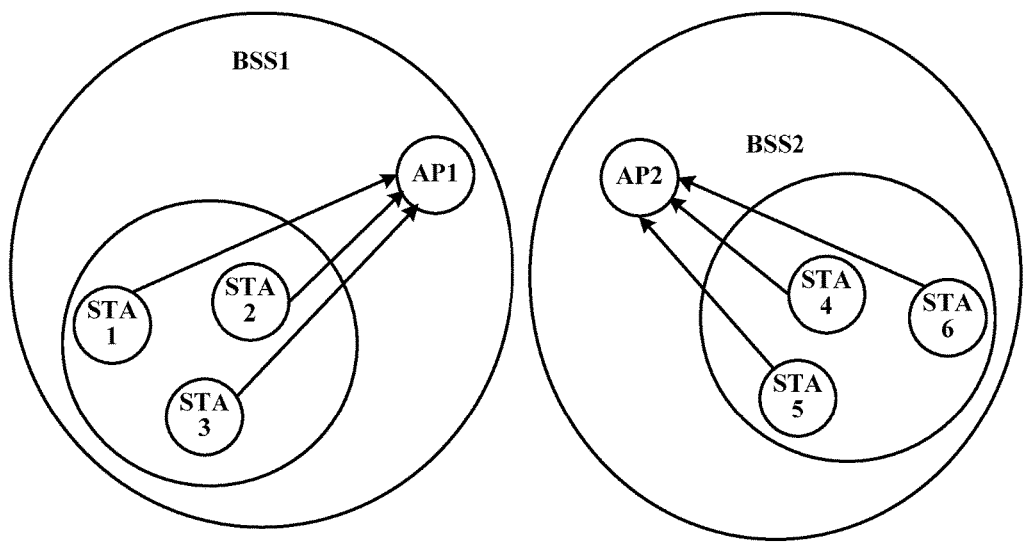
FIG. 1 is a schematic diagram of an application scenario of the present disclosure.
FIG. 2 is a signaling diagram of Embodiment 1 of a data transmission method according to the present disclosure.

Referring to FIG. 1, the present disclosure provides a multiuser parallel access scheme initiated by a STA. In a BSS1, after a STA 1 successfully obtains channel resources by means of contention, surrounding STAs STA 2 and STA 3 that are close to the STA 1 in geographic positions and that have service transmission demands are triggered to access a channel in parallel. In a BSS2, after a STA 4 successfully obtains channel resources by means of contention, surrounding STAs STA 5 and STA 6 that are close to the STA 4 in geographic positions and that have service transmission demands are triggered to access a channel in parallel. Parallel access may use an OFDM access (OFDMA) technology or may use a uplink multi user multiple-input multiple-output (UL MU-MIMO) technology. Because a distance between surrounding STAs is short, there is a slight difference between delays generated when signals are broadcast to an AP side, such as AP1 or AP2. Therefore, the solutions can satisfy a requirement for RTX sending synchronization between STAs. STAs in a same BSS are within a particular geographic range such that an interference range can be reduced. Therefore, an interference range can be effectively controlled.

An RTX sent by a STA in the present disclosure includes at least one or more of a length of buffer data, available bandwidth indication, an optional service type, a delay requirement, or the like.

To adapt to a requirement of 802.11ax for a channel bandwidth, a bandwidth of a single channel in the present disclosure may be 20 megahertz (MHz), 40 MHz, 80 MHz, 160 MHZ (80+80 MHZ), or the like.

Embodiment 1

This embodiment is described using an example in which a STA obtains a channel by means of contention and instructs a surrounding STA to randomly contend for access. In a case of a single channel, the single channel may be divided into multiple sub-channels. The sub-channels herein refer to dividing a channel into multiple parts in a frequency domain, and each part is referred to as a sub-channel.

Figure 3:
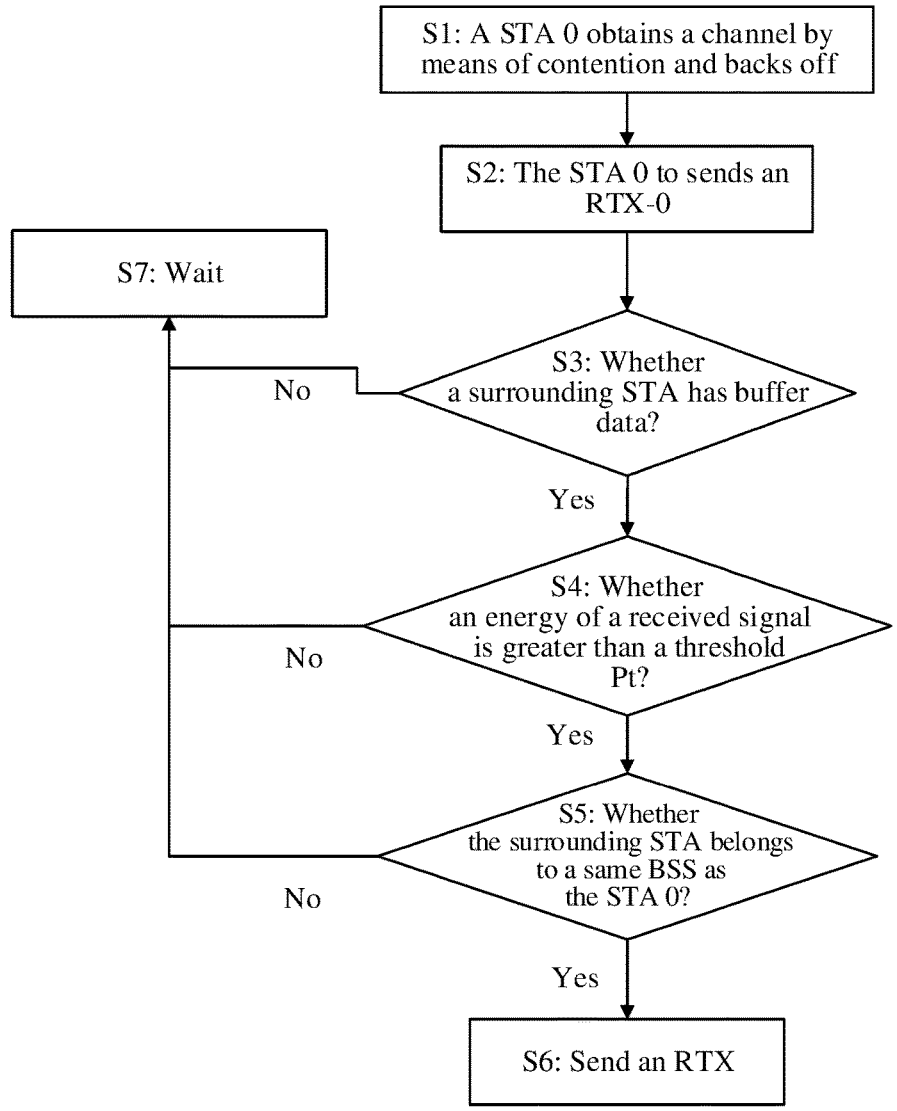
FIG. 3 is a flowchart in which a surrounding STA determines whether to follow a STA, obtaining a channel by means of contention, to send an RTX according to an embodiment of the present disclosure.

Referring to FIG. 2 and FIG. 3, FIG. 2 is a schematic diagram of sent signaling in Embodiment 1. In Embodiment 1, a STA 0 obtaining one channel by means of contention backs off and sends an RTX-0 frame on the channel. The RTX-0 frame is received by an AP in a local cell and another STA that can be obtained by means of listening. After receiving the RTX-0, a STA around the STA 0 first determines whether the STA has buffer data needing to be sent to the AP, then determines whether an energy of a signal received from the STA 0 is greater than a preset power threshold Pt, and then determines whether a sending node of the RTX-0 is in a same BSS as the STA. If the foregoing three following conditions are all satisfied, the STA sends an RTX after a period of a waiting time, to follow the STA 0 to perform uplink access. The AP performs resource scheduling after receiving requests to send sent by the STA 0 and a follower STA of the STA 0, and sends response information CTX to schedule the STA 0 and the follower STA of the STA 0 to transmit data on specified sub-channels.

In the embodiment shown in FIG. 2, STAs following the master STA 0 to send requests to send include a STA 1 to a STA 5. The STA 1 to the STA 5 send requests to send RTX 1 to RTX 5 on sub-channels obtained by means of contention. Because the STA 4 and the STA 5 collide on a same sub-channel, and the requests to send RTX 4 and RTX 5 sent by the STA 4 and the STA 5 cannot be normally decoded by the AP, the AP only sends response information CTX to the STA 0 and the STA 1 to the STA 3, to specify the STA 1 to the STA 3 to respectively transmit data DATA-1 to DATA-3 on sub-channels 1 to 3 and specify the STA 0 to transmit data DATA-0 on a sub-channel 4.

The waiting time may be any one of SIFS, point coordination interframe space (PIFS), distributed coordination interframe space (DIFS), or arbitration interframe space (AIFS). The STAs 1 to 5 each may randomly select a sub-channel to transmit an RTX thereof.

The RTX mentioned in the present disclosure is an RTX sent by the STA to the AP, the CTX is response information sent by the AP to the STA, and the CTX may be used to represent that an RTX of the STA is permitted or may be used to specify STAs to transmit data on corresponding sub-channels.

In a specific embodiment, a specific process of determining, by a surrounding STA, whether to follow the STA 0 to send an RTX is shown in FIG. 3.

Step S1: The STA 0 obtains a channel by means of contention and backs off.

Step S2: The STA 0 sends an RTX-0.

Step S3: Determine whether a surrounding STA has buffer data needing to be transmitted, if yes, perform step S4, and otherwise, perform step S7 and temporarily skip following the STA 0 to perform uplink access to the channel.

Step S4: Determine whether an energy of a signal received by the surrounding STA from the STA 0 is greater than a preset power threshold Pt, if the signal received by the STA from the STA 0 is greater than the preset power threshold Pt, perform step S5, and otherwise, perform step S7 and temporarily skip following the STA 0 to perform uplink access to the channel.

Step S5: Determine whether the surrounding STA and the STA 0 belong to a same BSS, if yes, perform step S6, and otherwise, perform step S7 and temporarily skip following the STA 0 to perform uplink access to the channel.

Step S6: If three conditions mentioned in steps S3 to S5 are all satisfied, the surrounding STA satisfying the conditions send an RTX and follows the STA 0 to access the channel in parallel.

Step S7: If any one of three conditions mentioned in steps S3 to S5 is not satisfied, the surrounding STA not satisfying the conditions enters a waiting state and temporarily does not follow the STA 0 to access the channel.

After the RTX-0 sent by the STA 0 that is the first to obtain the channel by means of contention is obtained by means of listening by the surrounding STA, only a STA needing to transmit buffer data in the surrounding STAs follows the STA 0 to access the channel. In this way, it may be avoided that a STA having no data transmission requirement occupies a channel, and a problem of "triggering without response" is avoided. Only a STA in the same BSS as the STA 0 in the surrounding STAs follows the STA 0 to access the channel such that interference diffusion can be avoided and an interference range can be reduced. Only a STA whose signal received from the STA 0 is greater than the preset power threshold Pt in the surrounding STAs follows the STA 0 to access the channel such that a STA following the STA 0 to perform access can be controlled within a certain range and quality of a communications signal can be ensured. In another specific embodiment of the present disclosure, a STA following the STA 0 to access the channel needs to satisfy only at least one of the foregoing three conditions.

Figure 4:
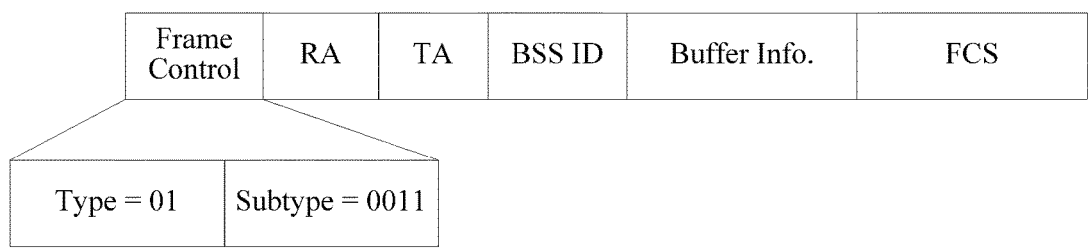
FIG. 4 is a structural diagram of an RTX frame according to Embodiment 1 of the present disclosure.

A frame structure of the RTX-0 sent by the STA 0 is shown in FIG. 4, and the RTX-0 includes the following fields: Frame Control indicates frame control, RA indicates receiver address, TA indicates transmitter address, BSS ID indicates BSS identifier, Buffer Info. indicates buffer information, and FCS indicates frame check sequence. A type of the Frame Control is: Type=01, and Subtype=0011. The BSS ID indicates an identifier of a BSS of a STA initiating multiuser parallel access, and is used to determine, by a surrounding STA, whether the STA is in a same BSS as the initiating STA. The Buffer info. includes information such as a length and a type of data needing to be sent by a STA node.

The RTX mentioned in this embodiment uses a fixed frame format, and a quantity of bits occupied by the RTX 1 to an RTX N may have a fixed length or a variable length. If the RTX has a variable length, a problem of aligning the RTX 1 to the RTX N needs to be considered. Non-alignment may result in that a node that first completes transmitting the RTX losses a sub-channel of the node, and the sub-channel is occupied by another node by means of contention. For a problem of non-alignment between lengths of the RTXs, there are three possible solutions. First, select a fixed RTX length and modulation and coding scheme (MCS), second, stipulate a maximum length of an RTX, and a STA having an RTX whose length is less than the maximum length enables the RTX to reach the maximum length in a manner of bit stuffing, and third, stipulate a maximum length of an RTX, and each STA selects, according to the length, an MCS that can enable the STA to reliably transmit data.

When there is a large quantity of STAs having uplink buffer data, and there is a relatively small amount of available channel or sub-channel data, if all STAs access the channels or sub-channels, serious collision is generated.

Referring to FIG. 2, after the STA 0 sends the RTX 0, possible behaviors of a surrounding STA are divided into three cases.

Case 1: When a STA sends an RTX, collision does not occur.

After a time of SIFS, the STAs 1 to 3 separately receive CTXs, and then the STAs 0 to 3 send corresponding data frames DATA 0 to 3 on allocated sub-channels. The CTXs sent by the AP may specify the STAs to transmit data on the specified sub-channels.

After data is completely sent, the STAs 0 to 4 wait for respective acknowledgement messages, such as acknowledgement character (ACK) or block acknowledgements (BAs) messages fed back by the AP.

Case 2: When two or more STAs (such as the STAs 4 and 5 in FIG. 2) select a same sub-channel to send RTXs, collision occurs.

The requests to send RTX 4 and RTX 5 sent by the STA 4 and the STA 5 cannot be normally decoded by the AP, the AP does not allocate sub-channels to the STA 4 and the STA 5, and STAs that collide on a same sub-channel cannot normally transmit data.

Case 3: If another STA around the STA 0 has no service for sending, after a time of waiting for the RTX 1 to the RTX N expires, the AP sends indication information to the STA 0 such that the STA 0 occupies a channel. The RTX sent by the STA 0 is a complete media access control (MAC) frame and includes duration, and a case in which the channel is taken by another node may be avoided using a network allocation vector (NAV).

The AP sends, according to a status of receiving the RTX sent by the surrounding STA of the STA 0, the CTX to the STA to schedule the STA to transmit data on a specified sub-channel. Using FIG. 2 as an example, the AP may send, on a whole channel, the CTX to the STAs 0 to 3 sending requests to send, or may respectively send the CTXs 1 to 3 on sub-channels 1 to 3 on which the RTXs 1 to 3 are transmitted. In the two manners of sending the CTX, the STAs 0 to 3 may be scheduled to send respective DATA 0 to 3 on specified sub-channels.

Figure 5:
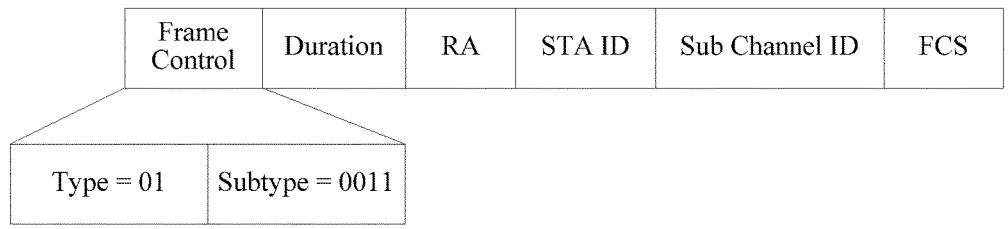
FIG. 5 is a structural diagram of a CTX frame according to Embodiment 1 of the present disclosure.

A frame structure of the CTX is shown in FIG. 5 and the CTX includes the following fields: Frame Control, Duration indicates duration, RA, STA ID indicates STA identifier, Sub Channel ID indicates sub-channel identifier, and FCS. A type of the Frame Control includes Type=01, and Subtype=0011. A STA specified by the STA ID accesses a sub-channel. The Sub-channel ID specifies a number of the sub-channel that the STA accesses. The STA number is in one-to-one correspondence with the sub-channel number. For example, the STA ID is 1, and the STA 1 is specified to access a channel. A number of the Sub Channel ID is 1, and the corresponding STA 1 is specified to access a sub-channel 1.

Embodiment 1 describes only a case in which there are six STAs and four available sub-channels. In actual situations, there may be more STAs and available sub-channels. A specific implementation process is similar to the solution described in Embodiment 1.

The AP may send the CTX using multiple scheduling algorithms, which may be selected according to actual needs. For example, the STA 1 transmits the RTX-1 on the sub-channel 1, and the CTX also specifies the STA 1 to access the sub-channel 1 to schedule the STA 1 to transmit data on the sub-channel 1.

Embodiment 2

When there is a large quantity of STAs having uplink data buffer, and there is a relatively small quantity of available sub-channels, if all surrounding STAs perform random access according to the manner in Embodiment 1, serious collision may be generated. Embodiment 2 is described using an example in which after obtaining a channel by means of contention, a STA instructs a surrounding STA to access a specified sub-channel. In this case, the STA specifies a sub-channel that the surrounding STA accesses such that collision can be reduced. In a case of a single channel, the single channel may be divided into multiple sub-channels. The sub-channels herein refer to dividing a channel into multiple parts in a frequency domain, and each part is referred to as a sub-channel.

Figure 6:
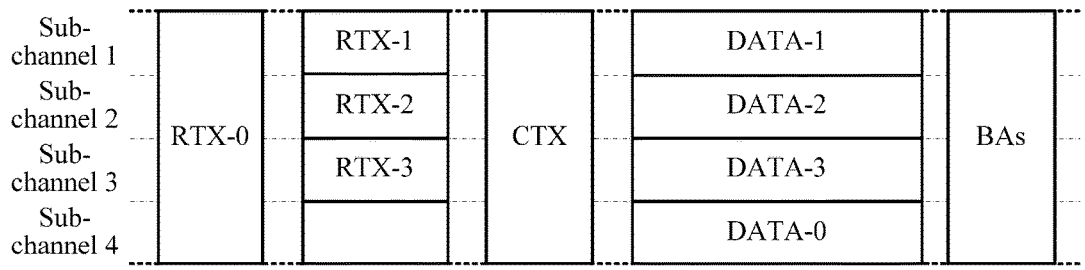
FIG. 6 is a signaling diagram of Embodiment 2 of a data transmission method according to the present disclosure.

In a schematic signaling diagram shown in FIG. 6, after backing off, a STA 0 obtaining one channel by means of contention sends an RTX-0 frame on the channel. After receiving the RTX-0, a STA around the STA 0 first determines whether the STA has buffer data needing to be sent to an AP, then determines and detects whether an energy of a signal received from the STA 0 is greater than a preset power threshold Pt, and then determines whether a sending node of the RTX-0 is in a same BSS as the STA. If the foregoing three conditions are all satisfied, at least one time length is waited for. The time length includes any one or a combination of SIFS, PIFS, DIFS, or AIFS, and STAs 1 to 3 respectively transmit respective RTXs on sub-channels specified in the RTX-0.

Figure 7:
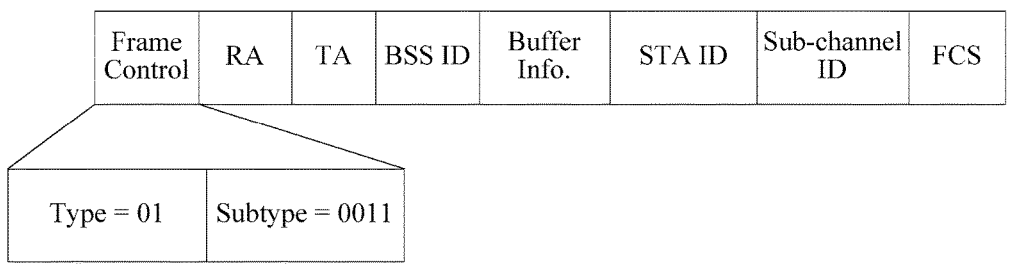
FIG. 7 is a structural diagram of an RTX frame according to Embodiment 2 of the present disclosure.

A structure of the RTX-0 frame sent by the STA 0 is shown in FIG. 7, and the RTX-0 frame includes the following fields: Frame Control, RA, TA, BSS ID, Buffer Info., STA ID, Sub Channel ID, and FCS.

A type of the Frame Control includes Type=01, and Subtype=0011. The BSS ID indicates an identifier of a BSS of the STA 0, and is used to determine, by a surrounding STA, whether the surrounding STA is in the same BSS as the STA 0. The Buffer info. includes information such as a length and a type of data needing to be sent by the STA 0. A surrounding STA specified by the STA ID accesses a sub-channel. The Sub-channel ID specifies a number of the sub-channel that the surrounding STA accesses. The STA ID is in one-to-one correspondence with the Sub-channel ID. For example, STA IDs are 1 to 3, and the STAs 1 to 3 are specified to access sub-channels. Numbers of the Sub Channel IDs are 1 to 3, and the STAs 1 to 3 are respectively specified to access sub-channels 1 to 3.

The STA 0 may specify, according to historical information, which surrounding STA accesses which sub-channel. The STA 0 may acquire information about the surrounding STA, such as an ID, a service, and an address, by listening to a MAC header transmitted by the surrounding STA. In summary, the STA 0 may acquire the information about the STA around the STA 0 such that the STA 0 can schedule the surrounding STA to access a specified sub-channel.

The AP sends, according to a status of receiving the RTX sent by the surrounding STA, a CTX to the STA sending the RTX, to schedule the STA to transmit data on a specified sub-channel. Using FIG. 7 as an example, the AP may send, on a whole channel, CTXs to the STAs 0 to 3 sending requests to send. The AP may respectively send CTXs 1 to 3 on the sub-channels 1 to 3 on which the RTXs 1 to 3 are transmitted. In the two manners of sending the CTX, the STAs 0 to 3 may be scheduled to send respective DATA 0 to 3 on specified sub-channels.

Embodiment 2 describes only a case in which there are four STAs and four available sub-channels. In actual situations, there may be more STAs and available sub-channels. A specific implementation process is similar to the solution described in Embodiment 2.

The AP may send the CTX using multiple scheduling algorithms, which may be selected according to actual needs. For example, the STA 1 transmits the RTX-1 on the sub-channel 1, and the CTX also specifies the STA 1 to access the sub-channel 1 to schedule the STA 1 to transmit data on the sub-channel 1.

Embodiment 3

This embodiment is described using an example in which a STA obtains a channel by means of contention and instructs a surrounding STA to access a specified sub-channel in a manner of UL MU-MIMO. In a case of a single channel, the single channel may be divided into multiple sub-channels. The sub-channels herein refer to dividing a channel into multiple parts in a frequency domain, and each part is referred to as a sub-channel.

Figure 8:
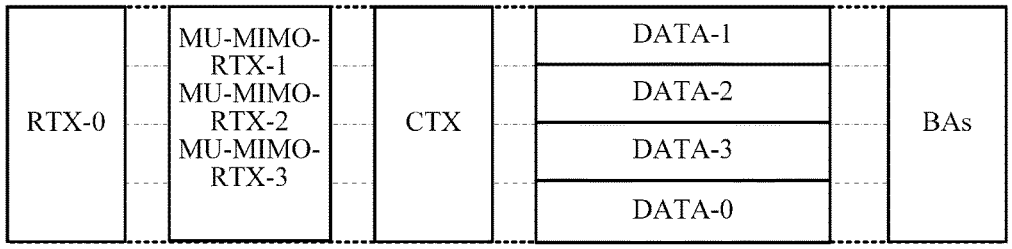
FIG. 8 is a signaling diagram of Embodiment 3 of a data transmission method according to the present disclosure.

As shown in FIG. 8, after backing off, a STA 0 obtaining one channel by means of contention sends an RTX-0 frame on the channel. After receiving the RTX-0, a STA around the STA 0 first determines whether the STA has buffer data needing to be sent to an AP, then determines and detects whether an energy of a signal received from the STA 0 is greater than a preset power threshold Pt, and then determines whether a sending node of the RTX-0 is in a same BSS as the STA. If the foregoing three conditions are all satisfied, after at least one time length is waited for, surrounding STAs 1 to 3 are specified to send of RTX frames 1 to 3 in a manner of UL MU-MIMO, where the time length includes any one or a combination of SIFS, PIFS, DIFS, or AIFS.

Figure 9:
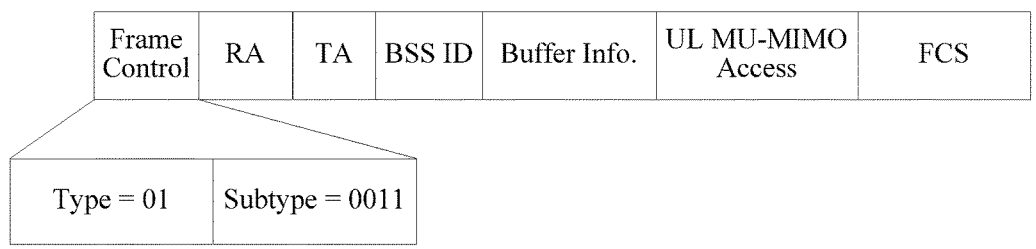
FIG. 9 is a structural diagram of an RTX frame according to Embodiment 3 of the present disclosure.

A structure of the RTX-0 frame sent by the STA 0 is shown in FIG. 9, and the RTX-0 frame includes the following fields: Frame Control, RA, TA, BSS ID, Buffer Info., UL MU-MIMO Access indicates uplink multi user multiple-input multiple-output access, and FCS. A type of the Frame Control includes Type=01, and Subtype=0011. The BSS ID indicates an identifier of the BSS of the STA 0, and is used to determine, by a surrounding STA, whether the surrounding STA is in the same BSS as the STA 0. The Buffer info. includes information such as a length and a type of data needing to be sent by the STA 0. The UL MU-MIMO Access specifies the surrounding STA to perform access in a manner of UL MU-MIMO. This embodiment is proposed under the premise that the AP and the STA support the MU-MIMO technology.

The AP sends, according to a status of receiving the RTX sent by the surrounding STA, a CTX to the STA to schedule the STA to transmit data on a specified sub-channel. The sub-channel herein refers to dividing a channel into multiple parts in a frequency domain, and each part is referred to as a sub-channel.

Using FIG. 8 as an example, the AP may send, on a whole channel, CTXs to the STAs 0 to 3 sending requests to send, or may respectively send CTXs 1 to 3 on sub-channels 1 to 3 on which the RTXs 1 to 3 are transmitted. In the two manners of sending the CTX, the STAs 0 to 3 may be scheduled to send respective DATA 0 to 3 on specified sub-channels.

Embodiment 3 describes only a case in which there are four STAs and four available sub-channels. In actual situations, there may be more STAs and available sub-channels. A specific implementation process is similar to the solution described in Embodiment 3. The STA 0 may send the CTX using multiple scheduling algorithms, which may be selected according to actual needs. Scheduling information is transmitted using the CTX, and the CTX includes application of an appropriate scheduling algorithm and can complete a scheduling task.

Embodiment 4

The embodiment described in this section is described using an example in which a STA obtains one channel by means of contention, instructs a surrounding STA to perform random access contention, and reserves a sub-channel for the STA. In a case of a single channel, the single channel may be divided into multiple sub-channels. The sub-channels herein refer to dividing a channel into multiple parts in a frequency domain, and each part is referred to as a sub-channel.

Figure 10:
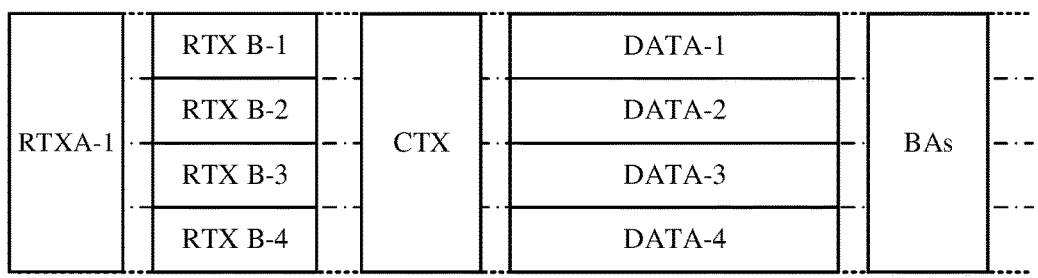
FIG. 10 is a signaling diagram of Embodiment 4 of a data transmission method according to the present disclosure.

After backing off, a STA 1 obtaining one channel by means of contention sends an RTX A-1 on a whole channel. The RTX A-1 includes a STA identifier of the STA 1 and a number of an accessed and reserved sub-channel. After at least one time length is waited for, the reserved sub-channel is selected for sending an RTX B-1, as shown in FIG. 10, where the time length includes any one or a combination of SIFS, PIFS, DIFS, or AIFS.

After obtaining the RTX A-1 by means of listening, a STA around the STA 1 first determines whether the STA has buffer data needing to be sent to an AP, then determines and detects whether an energy of a signal received from the STA 1 is greater than a preset power threshold Pt, and then determines whether a sending node of the RTX-0 is in a same BSS as the STA. If the foregoing three conditions are all satisfied, after at least one time length is waited for, STAs 2 to 4 send RTXs B-2 to B-4 on other sub-channels other than the reserved sub-channel, where the time length includes any one or a combination of SIFS, PIFS, DIFS, or AIFS. There is an interval of a time period between sending of the RTX A and subsequent RTX B frames such that STAs sending the subsequent RTX B frames can switch from a listen state to a sending state.

Figure 11:
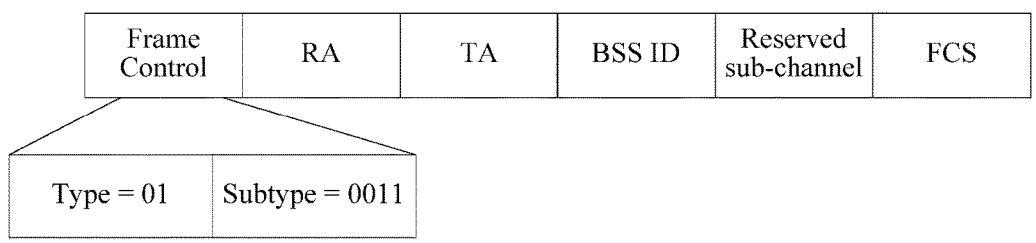
FIG. 11 is a structural diagram of an RTXA frame according to Embodiment 4 of the present disclosure.

A frame structure of the RTX A-1 sent by the STA 1 is shown in FIG. 11, and the RTX A-1 includes the following fields: Frame Control, RA, TA, BSS ID, Reserved sub-channel indicates reserved sub-channel, and FCS. A type of the Frame Control includes Type=01, and Subtype=0011. The BSS ID indicates an identifier of a BSS of a STA initiating multiuser uplink access, and is used to determine, by a surrounding STA, whether the surrounding STA and the initiating STA belong to a same cell. The Reserved sub-channel specifies the surrounding STA to randomly access a sub-channel other than the reserved sub-channel.

The AP sends, according to a status of receiving the RTX sent by the surrounding STA, a CTX to the STA to schedule the STA to transmit data on a specified sub-channel. FIG. 10 is used as an example, and a scheduling manner is not limited to specific forms in the figure. The AP may send the CTX on a whole channel or may respectively send CTXs 1 to 4 on sub-channels 1 to 4 on which the RTX B-1 to RTX B-4 are transmitted. In the two manners of sending the CTX, the STAs 1 to 4 may be scheduled to send respective DATA 1 to 4 on specified sub-channels.

Embodiment 4 describes only a case in which there are four STAs and four available sub-channels. In actual situations, there may be more STAs and available sub-channels. A specific implementation process is similar to a solution described in Embodiment 5. The STA 1 may send the CTX using multiple scheduling algorithms, which may be selected according to actual needs.

Figure 12:
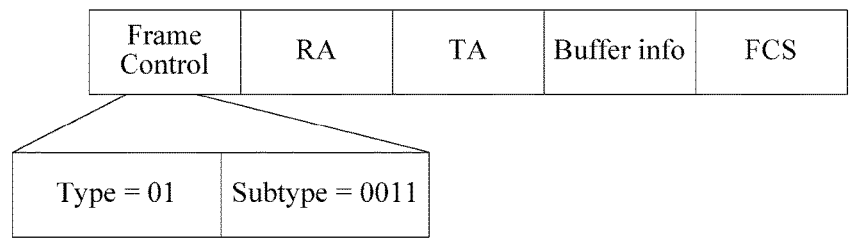
FIG. 12 is a structural diagram of an RTXB frame according to Embodiment 4 of the present disclosure.

A frame structure of the RTX B is shown in FIG. 12, and the RTX B includes the following fields: Frame Control, RA, TA, Buffer Info., and FCS. A type of the Frame Control includes Type=01, and Subtype=0011. The Buffer info. includes information such as a length and a type of data needing to be sent by a STA node.

Embodiment 5

This embodiment is described using an example in which a STA obtains two channels by means of contention, each channel includes four sub-channels, and the STA instructs a surrounding STA to randomly access a sub-channel or to access a specified sub-channel. In a case of a single channel, the single channel may be divided into multiple sub-channels. The sub-channels herein refer to dividing a channel into multiple parts in a frequency domain, and each part is referred to as a sub-channel.

Figure 13:
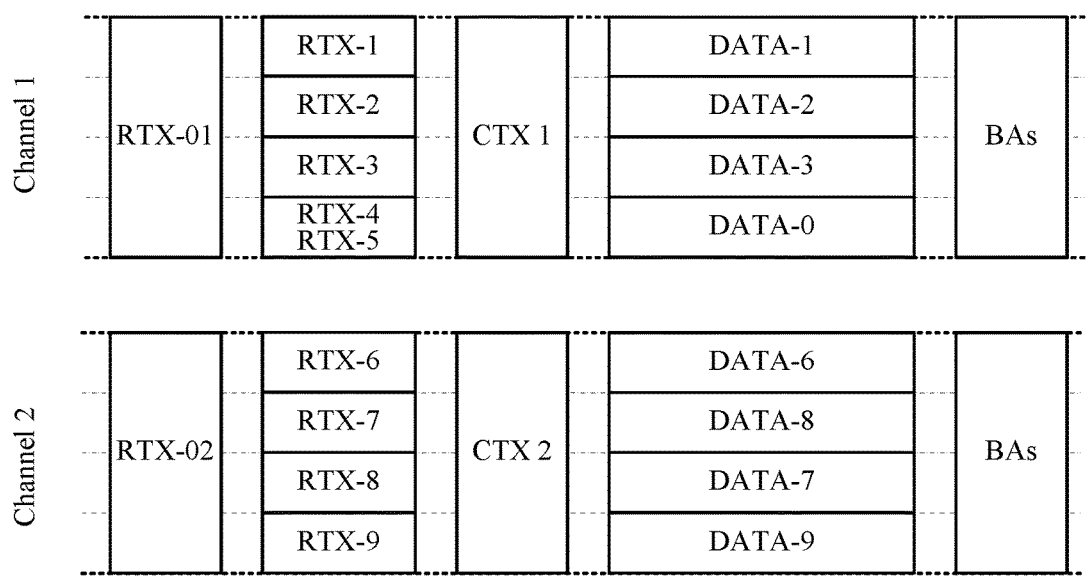
FIG. 13 is a signaling diagram of Embodiment 5 of a data transmission method according to the present disclosure.

As shown in FIG. 13, after backing off, a STA 0 obtaining two channels by means of contention sends an RTX-0 frame on two channels at the same time. After receiving the RTX-0, a STA around the STA 0 first determines whether the STA has buffer data needing to be sent to an AP, then determines and detects whether an energy of a signal received from the STA 0 is greater than a preset power threshold Pt, and then determines whether a sending node of the RTX-0 is in a same BSS as the STA. If the foregoing three conditions are all satisfied, after at least one time length is waited for, on a channel 1, STAs 1 to 5 randomly select sub-channels and transmit RTXs 1 to 5, where the time length includes any one or a combination of SIFS, PIFS, DIFS, or AIFS. The STAs 4 and 5 both select a sub-channel 4 on the channel 1 and access the sub-channel 4. Consequently, collision is generated.

An AP sends, according to a status of receiving the RTX sent by the surrounding STA, a CTX 1 to the STA, to schedule the STA to transmit data on a specified sub-channel. Using FIG. 13 as an example, the STA 0 may send the CTX 1 on all sub-channels on the channel 1 on which STAs 1 to 3 are to be scheduled, or may respectively send CTXs 1 to 3 only on sub-channels 1 to 3 on which the RTXs 1 to 3 are transmitted. In the two manners of sending the CTX, the STAs 0 to 3 may be scheduled to send respective DATA 0 to 3 on the sub-channels on which the RTXs 1 to 3 are transmitted, or specific sub-channels are allocated to the STAs 0 to 3 for sending respective DATA 0 to 3.

On a channel 2, STAs 6 to 9 transmit RTXs 6 to 9 on specified sub-channels, the RTXs 6 to 9 respectively access specified sub-channels 1 to 4, and collision does not occur. An AP sends, according to a status of receiving the RTX sent by the surrounding STA, a CTX 2 to the STA, to schedule the STA to transmit data on a specified sub-channel. Using FIG. 14 as an example, the STA 0 may send the CTX 2 on all sub-channels on the channel 2 on which the STAs 6 to 9 are to be scheduled, or may respectively send the CTXs 6 to 9 only on the sub-channels 1 to 4 on which the RTXs 6 to 9 are transmitted. In the two manners of sending the CTX, the STAs 6 to 9 may be scheduled to send respective DATA 6 to 9 on the sub-channels on which the RTXs 6 to 9 are transmitted, or specific sub-channels are allocated to the STAs 6 to 9 for sending respective DATA 0 to 3.

Figure 14:
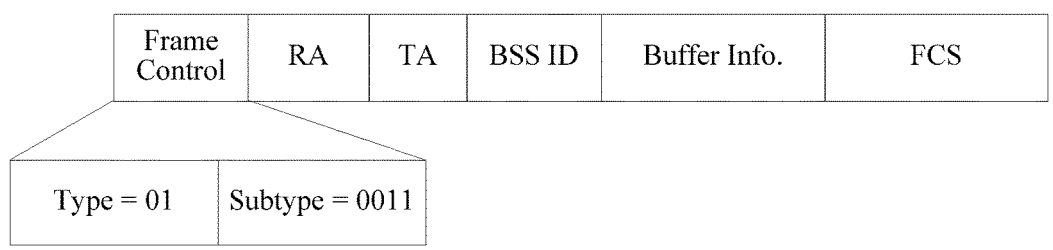
FIG. 14 is a structural diagram of an RTX-01 frame according to Embodiment 5 of the present disclosure.

A frame structure of an RTX-01 sent by the STA 0 is shown in FIG. 14, and the RTX-01 includes the following fields: Frame Control, RA, TA, BSS ID, Buffer Info., and FCS. A type of the Frame Control includes Type=01, and Subtype=0011. The BSS ID indicates an identifier of a BSS of a STA initiating multiuser parallel access, and is used to determine, by a surrounding STA, whether the STA is in a same BSS as the initiating STA. The Buffer info. includes information such as a length and a type of data needing to be sent by a STA node.

Figure 15:
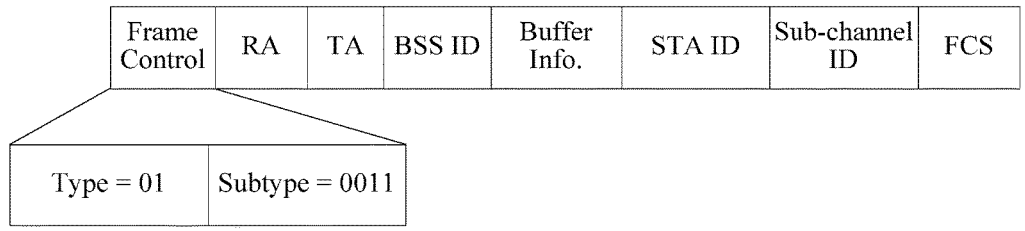
FIG. 15 is a structural diagram of an RTX-02 frame according to Embodiment 5 of the present disclosure.

A frame structure of an RTX-02 sent by the STA 0 is shown in FIG. 15, and the RTX-02 includes the following fields: Frame Control, RA, TA, BSS ID, Buffer Info., STA ID, Sub Channel ID, and FCS. A type of the Frame Control includes Type=01, and Subtype=0011. The BSS ID indicates an identifier of a BSS of the STA 0, and is used to determine, by a surrounding STA, whether the surrounding STA is in a same BSS as the STA 0. The Buffer info. includes information such as a length and a type of data needing to be sent by the STA 0. A STA specified by the STA ID accesses a sub-channel. The Sub-channel ID specifies a number of the sub-channel that the STA accesses. The STA ID is in one-to-one correspondence with the Sub-channel ID.

The STA 0 may specify, according to historical information, which STA accesses which sub-channel. The STA 0 may acquire information about the surrounding STA, such as an ID, a service, and an address, by listening to a MAC header transmitted by the surrounding STA. In summary, the STA 0 may acquire the information about the STA around the STA 0 such that the STA 0 can schedule the surrounding STA to access a specified sub-channel.

Embodiment 5 describes only a case in which there are 10 STAs and two channels, and each channel includes four available sub-channels. In actual situations, there may be more STAs and available channels and sub-channels thereof. A specific implementation process is similar to the solution described in Embodiment 5. The STA 0 may send the CTX using multiple scheduling algorithms, which may be selected according to actual needs.

A solution, described in this embodiment of the present disclosure, of multiuser parallel access initiated by a STA has the following advantages. A requirement for RTX sending synchronization between STAs is satisfied, an interference range can be effectively controlled, "triggering without response" is avoided, an interference range of each data transmission is reduced, a conflict of uplink access is effectively controlled, a problem of "a proximity effect" is resolved, and an uplink synchronization problem is better resolved.

Embodiment 6

Figure 16:
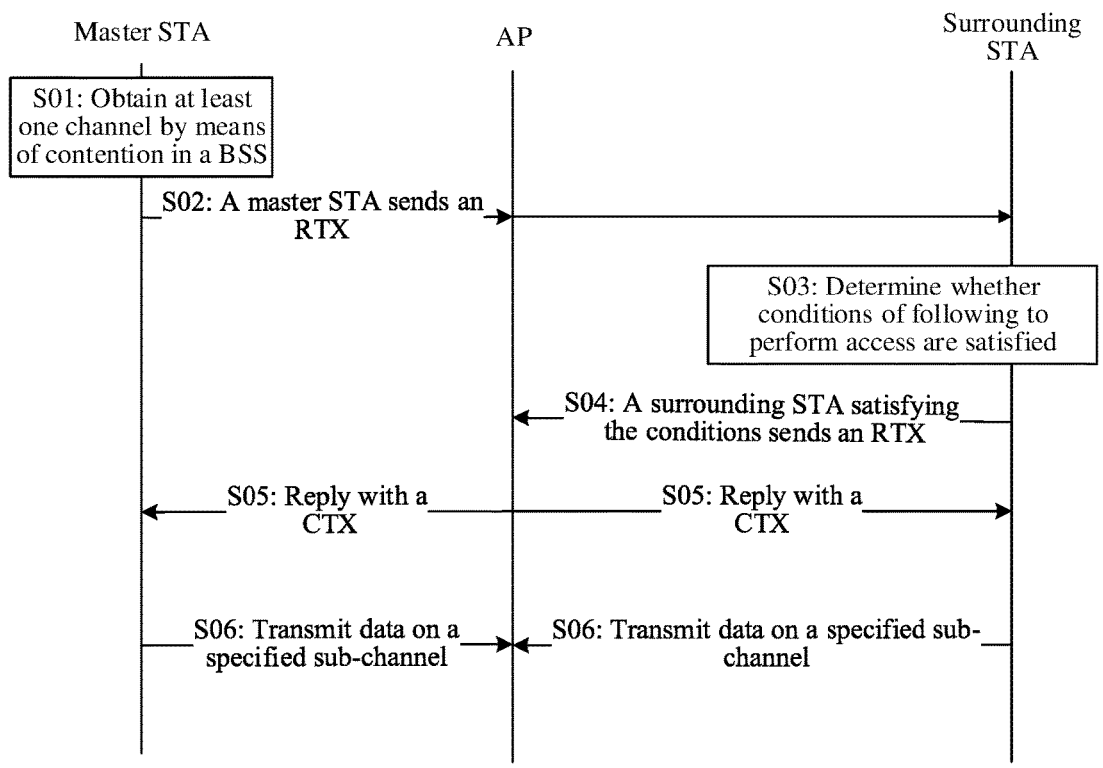
FIG. 16 is a flowchart of a data transmission method according to Embodiment 6 of the present disclosure.

With reference to Embodiment 1 to Embodiment 5, Embodiment 6 of the present disclosure provides a data transmission method. Referring to FIG. 16, the method includes the following steps.

Step S01: A master STA obtains at least one channel by means of contention in a BSS.

Step S02: The master STA sends an RTX. If the master STA obtains one channel by means of contention, the RTX is sent on the channel. For example, in Embodiment 1 to Embodiment 3, a STA 0 sends an RTX-0 frame on a channel obtained by means of contention (see FIG. 2, FIG. 6, and FIG. 8). If the master STA obtains multiple channels by means of contention, RTXs are sent on the multiple channels obtained by means of contention. For example, in Embodiment 5, the STA 0 respectively sends an RTX-01 and an RTX-02 on two channels obtained by means of contention. The RTX sent by the master STA can be received by an AP in a same BSS and a STA around the master STA or obtained by means of listening by an AP in a same BSS and a STA around the master STA. The RTX sent by the master STA includes at least buffer data information (i.e., Buffer Info.) and information about the BSS (such as BSS ID) to which the master STA belongs. The BSS information is used to identify, by another receiving node, whether the receiving node is in the same BSS as the master STA. The Buffer data information (Buffer Info.) includes information such as a length and a type of data needing to be sent by the master STA. The RTX sent by the master STA may further include information such as a STA number (i.e., STA ID) and a sub-channel number (i.e., Sub-Channel ID). The STA number is used to specify a corresponding STA to access a sub-channel, and the sub-channel number specifies a sub-channel that the corresponding STA accesses. The STA number is in one-to-one correspondence with the sub-channel number.

Step S03: The surrounding STA obtaining, by means of listening, the RTX sent by the master STA determines whether the surrounding STA satisfies conditions of following the master STA to perform access, where the specific following conditions are the surrounding STA obtaining, by means of listening, the RTX sent by the master STA has buffer data to be transmitted, the surrounding STA is in the same BSS as the master STA, and a power of a signal received from the master STA is greater than a preset threshold.

Step S04: The surrounding STA satisfying the following conditions sends an RTX. Further, the surrounding STA satisfying the following conditions may randomly contend for access to a sub-channel and sends the RTX on the sub-channel obtained by means of contention. The surrounding STA satisfying the following conditions may send the RTX on a specified channel according to indication information (for example, information, such as a STA number and a sub-channel number, included in the RTX sent by the master STA) included in the RTX sent by the master STA.

Step S05: After receiving RTX information sent by STAs (including the master STA and the surrounding STA that sends the RTX), the AP replies to the STAs with CTXs to instruct an access STA to transmit data on a specified sub-channel. The CTX includes information such as a STA number and a sub-channel number. The STA number is used to specify a corresponding STA to access a sub-channel, and the sub-channel number specifies a sub-channel that the corresponding STA accesses. The STA number is in one-to-one correspondence with the sub-channel number. A sub-channel on which the surrounding STA satisfying the following conditions sends the RTX and a sub-channel on which the surrounding STA sends data may be the same or may be different. For example, a STA 1 contending for access to a sub-channel 1 sends an RTX on the sub-channel 1, and after receiving the RTX of the STA 1, the AP may allocate, according to a sub-channel occupation status, the sub-channel 1 to the STA 1 for transmitting data or may allocate another sub-channel to the STA 1 for transmitting data.

If the surrounding STA satisfying the following conditions accesses a sub-channel in a manner of random contention, collision may be generated. RTXs sent by STAs colliding with each other cannot be normally decoded by the AP. Therefore, the AP does not allocate a sub-channel to the STA colliding with each other, for sending data, and the AP may allocate a sub-channel, on which collision occurs, to another STA for sending data. For example, a STA 4 and a STA 5 in FIG. 2 collide on a sub-channel 4. Subsequently, the AP allocates the sub-channel 4 to the master STA 0 for sending data DATA-0, and does not allocate sub-channels to the STA 4 and the STA 5 colliding with each other, for sending data.

Step S06: The master STA and the surrounding STA satisfying the following conditions can transmit data on sub-channels specified by the AP.

With reference to Embodiment 1 to Embodiment 5, Embodiment 6 of the present disclosure further provides a communications system. Referring to FIG. 17, the communications system includes a master STA 10, where the master STA 10 obtains at least one channel by means of contention in a BSS and includes a sending unit 12 configured to send an RTX, one or more surrounding STAs 20 capable of obtaining, by means of listening, the RTX sent by the master STA 10, where each surrounding STA 20 includes a determining unit 22 configured to determine whether the surrounding STA 20 satisfies following conditions of following the master STA 10 to send an RTX, and the following conditions include the surrounding STA 20 has buffer data to be transmitted, the surrounding STA 20 is in the same BSS as the master STA 10, and a power of a signal received from the master STA 10 is greater than a preset threshold, and each surrounding STA 20 further includes a sending unit 24 configured to send an RTX when the surrounding STA 20 satisfies the following conditions, and an AP 30 in the same BSS as the master STA 10, where the AP 30 includes a receiving unit 32 and a sending unit 34, the receiving unit 32 is configured to receive the requests to send sent by the master STA 10 and the follower STA of the master STA 10, and the sending unit 34 is configured to send response information to schedule the master STA 10 and the follower STA of the master STA 10 to transmit data on specified sub-channels. The follower STA is a STA satisfying the foregoing following conditions.

Further, the RTX sent by the master STA 10 includes buffer data information and information about the BSS to which the master STA 10 belongs, the BSS information is used to identify, by the surrounding STA 20, whether the surrounding STA 20 is in the same BSS as the master STA 10, and the buffer data information includes a length and a type of data needing to be sent by the master STA 10.

Further, the follower STA can send an RTX on a sub-channel specified by the master STA 10. The RTX sent by the master STA 10 further includes a STA number and a sub-channel number, and the STA number is used to specify a corresponding follower STA to access a sub-channel, the sub-channel number is used to specify a sub-channel that the corresponding follower STA accesses, and the STA number is in one-to-one correspondence with the sub-channel number.

Further, the RTX sent by the master STA 10 or the surrounding STA 20 is sent in a manner of OFDMA or MU-MIMO.

The RTX sent by the master STA 10 or the surrounding STA 20 further includes access manner indication information, and the access manner indication information is used to instruct the STA to perform access in a manner of OFDMA or UL MU-MIMO.

Further, the master STA 10 and the follower STA of the master STA 10 can transmit data on sub-channels specified by the AP 30. The response information includes a STA number and a sub-channel number, and the STA number is used to specify a corresponding follower STA to access a sub-channel, the sub-channel number is used to specify a sub-channel that the corresponding follower STA accesses, and the STA number is in one-to-one correspondence with the sub-channel number.

Embodiment 7

Based on Embodiment 1 to Embodiment 5, Embodiment 7 of the present disclosure further provides a data transmission method. Further referring to FIG. 18, the method includes the following steps.

Step S21: A STA obtaining at least one channel by means of contention in a BSS sends an RTX, or sends an RTX when the STA obtains, by means of listening, an RTX sent by another STA obtaining at least one channel by means of contention, and the other STA satisfies following conditions, where the BSS includes an AP and multiple STAs, the following conditions include the STA has buffer data to be transmitted, the STA is in a same BSS as a master STA, and a power of a signal received from the master STA is greater than a preset threshold.

Step S22: The STA sending the RTX receives response information sent by the AP to transmit data on a sub-channel specified in the response information.

Further, the RTX sent by the STA includes buffer data information and information about the BSS to which the STA belongs, the BSS information is used to identify, by another receiving node, whether the receiving node is in the same BSS as the STA, and the buffer data information includes a length and a type of data needing to be sent by the STA.

Further, the RTX sent by the STA obtaining at least one channel by means of contention includes a STA number and a sub-channel number, the STA number is used to specify a corresponding follower STA to access a sub-channel, the sub-channel number specifies a sub-channel that the corresponding follower STA accesses, and the STA number is in one-to-one correspondence with the sub-channel number, and the follower STA is a STA satisfying the following conditions.

Further, the RTX is sent in a manner of OFDMA or MU-MIMO.

Further, the RTX sent by the STA further includes access manner indication information, and the access manner indication information is used to instruct the STA to perform access in a manner of OFDMA or UL MU-MIMO.

Further, the RTX uses an RTX frame structure, and the data transmission method further includes determining whether a frame length of an RTX to be sent by the STA is the same as a preset frame length, and enabling, in a manner of bit stuffing, the frame length of the RTX to reach the preset frame length when the frame length of the RTX to be sent is less than the preset frame length.

Further, the method further includes selecting an MCS according to the preset frame length.

Figure 19:
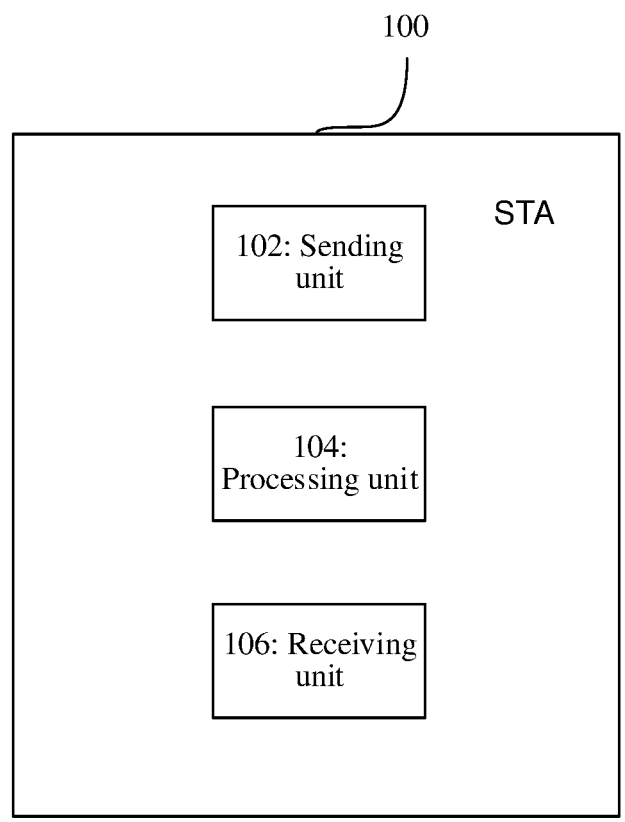
FIG. 19 is a composition diagram of modules of a STA according to Embodiment 7 of the present disclosure.

Embodiment 7 of the present disclosure further provides a STA 100. As shown in FIG. 19, the STA 100 includes a sending unit 102 configured to send an RTX when the STA 100 obtains at least one channel by means of contention, or send an RTX when the STA 100 obtains, by means of listening, an RTX sent by another STA obtaining at least one channel by means of contention, and the other STA satisfies following conditions, where the following conditions include the STA has buffer data to be transmitted, the STA is in a same BSS as the STA obtaining at least one channel by means of contention, and a power of a signal received from the STA obtaining at least one channel by means of contention is greater than a preset threshold, and a receiving unit 106 configured to receive response information sent by an AP, where the response information can be used to schedule the STA to transmit data on a specified sub-channel.

Further, the RTX sent by the STA 100 includes buffer data information and information about the BSS to which the STA 100 belongs, the BSS information is used to identify, by another receiving node, whether the receiving node is in the same BSS as the STA 100, and the buffer data information includes a length and a type of data needing to be sent by the STA 100.

Further, the RTX sent by the STA 100 obtaining at least one channel by means of contention includes a STA number and a sub-channel number. The STA number is used to specify a corresponding follower STA to access a sub-channel, the sub-channel number specifies a sub-channel that the corresponding follower STA accesses, and the STA number is in one-to-one correspondence with the sub-channel number, and the follower STA is a STA satisfying the following conditions.

Further, the RTX is sent in a manner of OFDMA or MU-MIMO.

Further, the RTX sent by the STA further includes access manner indication information, and the access manner indication information is used to instruct the STA to perform access in a manner of OFDMA or UL MU-MIMO.

The STA 100 further includes a processing unit 104, the RTX uses an RTX frame structure, the processing unit 104 is configured to determine whether a frame length of an RTX to be sent by the STA 100 is the same as a preset frame length, and if the frame length of the RTX to be sent by the STA 100 is less than the preset frame length, the processing unit 104 is further configured to enable, in a manner of bit stuffing, the frame length of the RTX to reach the preset frame length. The processing unit 104 may be further configured to select an MCS according to the preset frame length.

Embodiment 8

Figure 20:
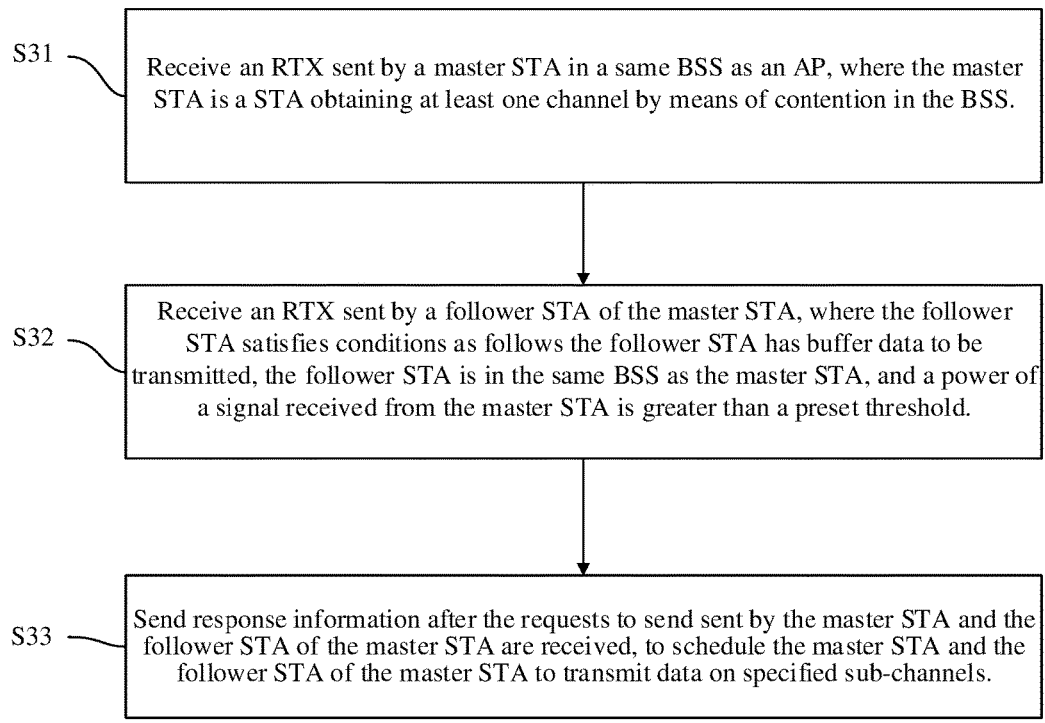
FIG. 20 is a flowchart of a data transmission method according to Embodiment 8 of the present disclosure.

Based on Embodiment 1 to Embodiment 5, Embodiment 8 of the present disclosure further provides a data transmission method. Further referring to FIG. 20, the method includes the following steps.

Step S31: Receive an RTX sent by a master STA in a same BSS as an AP, where the master STA is a STA obtaining at least one channel by means of contention in the BSS.

Step S32: Receive an RTX sent by a follower STA of the master STA, where the follower STA satisfies conditions as follows the follower STA has buffer data to be transmitted, the follower STA is in the same BSS as the master STA, and a power of a signal received from the master STA is greater than a preset threshold.

Step S33: Send response information after the requests to send sent by the master STA and the follower STA of the master STA are received, to schedule the master STA and the follower STA of the master STA to transmit data on specified sub-channels.

Further, the response information uses a CTX frame structure, the response message includes a STA number and a sub-channel number, the STA number is used to specify a STA to access a sub-channel, the sub-channel number is used to specify a sub-channel that the corresponding STA accesses, and the STA number is in one-to-one correspondence with the sub-channel number.

Further, the method further includes receiving data that is sent by the master STA and the follower STA of the master STA on the specified sub-channels, and sending acknowledgement messages to the master STA and the follower STA of the master STA after the data sent by the master STA and the follower STA of the master STA is received.

Further, the method further includes indication information to the master STA such that the master STA occupies the channel obtained by means of contention if another STA around the master STA has no service for sending, after waiting for a preset time, sending, by the AP.

Further, a manner of sending, by the AP, the response information to the master STA and a slave STA includes sending, by the AP, the response information on a whole channel on which the master STA and the follower STA are to be scheduled, or separately sending, by the AP, the response information CTX to the master STA and the follower STA of the master STA on sub-channels on which the RTX of the follower STA is transmitted.

Figure 21:
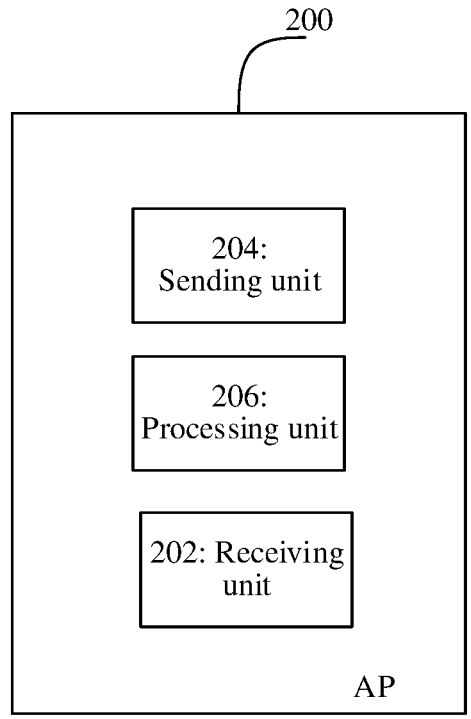
FIG. 21 is a composition diagram of modules of an AP according to Embodiment 8 of the present disclosure.

Embodiment 8 of the present disclosure further provides an AP 200. Further referring to FIG. 21, the AP 200 includes a receiving unit 202 configured to receive an RTX sent by a master STA in a same BSS as the AP 200, where the master STA is a STA obtaining at least one channel by means of contention in the BSS, receive an RTX sent by a follower STA of the master STA, where the follower STA satisfies conditions as follows: the follower STA has buffer data to be transmitted, the follower STA is in the same BSS as the master STA, and a power of a signal received from the master STA is greater than a preset threshold, a sending unit 204 configured to send response information after the requests to send sent by the master STA and the follower STA of the master STA are received to schedule the master STA and the follower STA of the master STA to transmit data on specified sub-channels, and a processing unit 206, where the requests to send sent by the master STA and the follower STA include buffer data information, the processing unit 206 allocates sub-channels to the master STA and the follower STA according to the buffer data information of the master STA and the follower STA, for example, allocates sub-channels to the master STA and the follower STA according to sizes of buffer data volumes of the master STA and the follower STA, where one or more sub-channels may be allocated to a STA having a greater volume of buffer data to be transmitted to satisfy a data transmission requirement, or the processing unit 206 may allocates sub-channels to the follower STA and the master STA according to a number of a sub-channel on which the follower STA sends the RTX. As shown in FIG. 2, follower STAs 1 to 3 respectively transmit requests to send RTXs 1 to 3 on sub-channels 1 to 3. Therefore, the processing unit 206 also specifies the follower STAs 1 to 3 to respectively transmit data on the sub-channels 1 to 3 and specifies the master STA 0 to transmit data on another sub-channel (such as a sub-channel 4) that is not occupied.

Further, the response information uses a CTX frame structure, the response message includes a STA number and a sub-channel number, the STA number is used to specify a STA to access a sub-channel, the sub-channel number is used to specify a sub-channel that the corresponding STA accesses, and the STA number is in one-to-one correspondence with the sub-channel number.

The receiving unit 202 is further configured to receive data that is sent by the master STA and the follower STA of the master STA on the specified sub-channels, and the sending unit 204 is further configured to send acknowledgement messages to the master STA and the follower STA of the master STA after the data sent by the master STA and the follower STA of the master STA is received.

Figure 22:
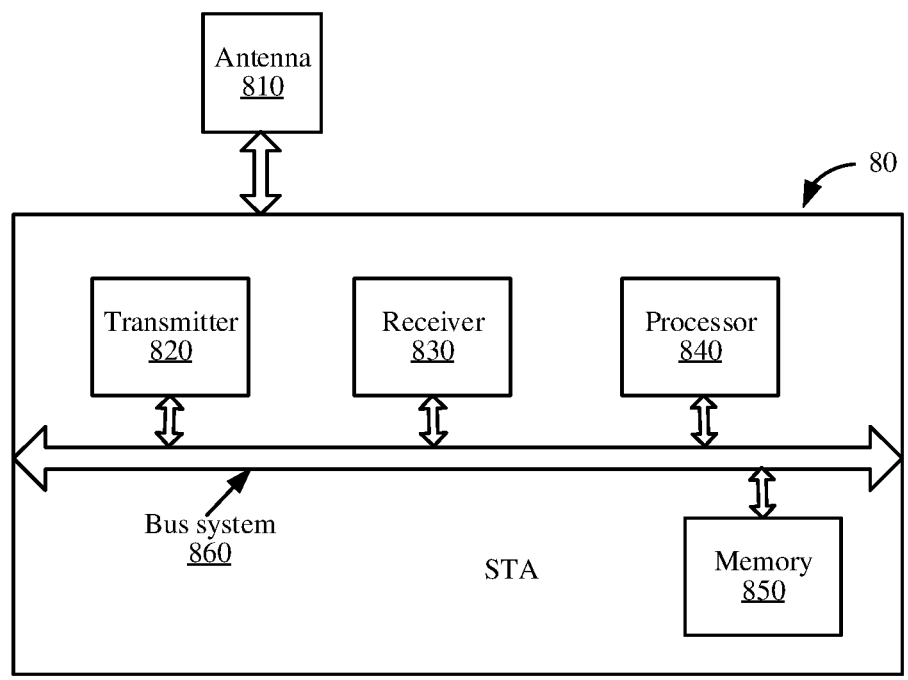
FIG. 22 is a schematic structural diagram of a STA according to an embodiment of the present disclosure.

In the embodiment shown in FIG. 22, a STA 80 includes an antenna 810, a transmitter 820, a receiver 830, a processor 840, and a memory 850. The processor 840 controls an operation of the STA 80 and may be configured to process a signal. The memory 850 may include a read-only memory (ROM) and a random access memory (RAM) and provides instructions and data to the processor 840. The transmitter 820 and the receiver 830 may be coupled to the antenna 810. Components of the STA 80 are coupled together using a bus system 860. Besides a data bus, the bus system 860 further includes a power bus, a control bus, and a status signal bus.

Further, the processor 840 may control the STA 80 to execute the following operations if the STA 80 obtains at least one channel by means of contention in a BSS, or the STA 80 obtains, by means of listening, an RTX sent by another STA obtaining at least one channel by means of contention and the other STA satisfies following conditions, sending, by the STA 80, an RTX, where the following conditions include the STA has buffer data to be transmitted, the STA is in the same BSS as the master STA, and a power of a signal received from the master STA is greater than a preset threshold, and receiving, by the STA sending the RTX, response information sent by an AP to transmit data on a sub-channel specified in the response information.

Further, the RTX sent by the STA 80 includes buffer data information and information about the BSS to which the STA 80 belongs, the BSS information is used to identify, by another receiving node, whether the receiving node is in the same BSS as the STA 80, and the buffer data information includes a length and a type of data needing to be sent by the STA 80.

Further, the RTX sent by the STA 80 obtaining at least one channel by means of contention includes a STA number and a sub-channel number. The STA number is used to specify a corresponding follower STA to access a sub-channel, the sub-channel number specifies a sub-channel that the corresponding follower STA accesses, and the STA number is in one-to-one correspondence with the sub-channel number, and the follower STA is a STA satisfying the following conditions.

Further, the RTX is sent in a manner of OFDMA or MU-MIMO.

The RTX sent by the STA 80 further includes access manner indication information, and the access manner indication information is used to instruct the STA 80 to perform access in a manner of OFDMA or UL MU-MIMO.

Further, the RTX uses an RTX frame structure, and the data transmission method further includes determining whether a frame length of an RTX to be sent by the STA 80 is the same as a preset frame length, and enabling, in a manner of bit stuffing, the frame length of the RTX to reach the preset frame length when the frame length of the RTX to be sent is less than the preset frame length.

The method further includes selecting an MCS according to the preset frame length.

Figure 23:
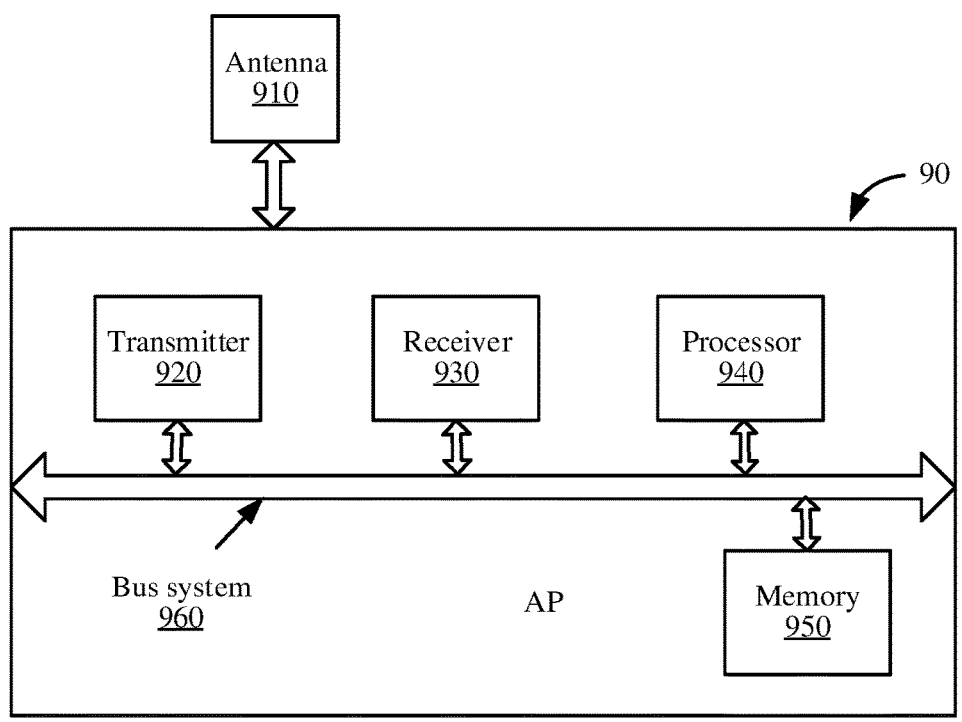
FIG. 23 is a schematic structural diagram of an AP according to an embodiment of the present disclosure.

In the embodiment shown in FIG. 23, an AP 90 includes an antenna 910, a transmitter 920, a receiver 930, a processor 940, and a memory 950. The processor 940 controls an operation of the AP 90 and may be configured to process a signal. The memory 950 may include a ROM and a RAM and provides instructions and data to the processor 940. The transmitter 920 and the receiver 930 may be coupled to the antenna 910. Components of the AP 90 are coupled together using a bus system 960. Besides a data bus, the bus system 960 further includes a power bus, a control bus, and a status signal bus.

Further, the processor 940 may control the AP 90 to execute the following operations of receiving an RTX sent by a master STA in a same BSS as the AP 90, where the master STA is a STA obtaining at least one channel by means of contention in the BSS, receiving an RTX sent by a follower STA of the master STA, where the follower STA satisfies conditions as follows the follower STA has buffer data to be transmitted. The follower STA is in the same BSS as the master STA, and a power of a signal received from the master STA is greater than a preset threshold, and sending response information after the requests to send sent by the master STA and the follower STA of the master STA are received to schedule the master STA and the follower STA of the master STA to transmit data on specified sub-channels.

The AP 90 receives data that is sent by the master STA and the follower STA of the master STA on the specified sub-channels, and sends acknowledgement messages to the master STA and the follower STA of the master STA after the data sent by the master STA and the follower STA of the master STA is received.

If another STA around the master STA has no service for sending, after waiting for a preset time, the AP 90 sends indication information to the master STA such that the master STA occupies the channel obtained by means of contention.

A manner of sending, by the AP 90, the response information to the master STA and a slave STA includes sending, by the AP 90, the response information on a whole channel on which the master STA and the follower STA are to be scheduled, or separately sending, by the AP 90, the response information CTX to the master STA and the follower STA of the master STA on sub-channels on which the RTX of the follower STA is transmitted.

Further, the response information uses a CTX frame structure, the response message includes a STA number and a sub-channel number, the STA number is used to specify a STA to access a sub-channel, the sub-channel number is used to specify a sub-channel that the corresponding STA accesses, and the STA number is in one-to-one correspondence with the sub-channel number.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication access may be implemented through some interfaces. The indirect couplings or communication access between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit. Further, the integrated unit may be implemented using software plus necessary universal hardware. The universal hardware includes a universal integrated circuit, a universal central processing unit (CPU), a universal memory, a universal component, and the like. Certainly, the integrated unit may be implemented using dedicated hardware including a dedicated integrated circuit, a dedicated CPU, a dedicated memory, a dedicated component, and the like. Further, the STAs (including a STA 0 that is the first to obtain a channel by means of contention and a follower STA of the STA) and the APs in the foregoing embodiments may implement the signaling process and relevant functions shown in FIG. 2 to FIG. 16 using a dedicated hardware thereof including a dedicated integrated circuit, a dedicated CPU, a dedicated memory, a dedicated component, and the like.

When the integrated unit is implemented in the form of a software functional unit and sold or used as an independent product, the integrated unit may be stored in a computer-readable storage medium. Based on such an understanding, the technical solutions of the present disclosure essentially, or the part contributing to other approaches, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A station (STA), comprising:
   a transmitter configured to:
      send a first request to send (RTX) when the STA obtains at least a first channel by contention; and
      send a third RTX when the STA obtains, by listening, a second RTX from a second STA obtaining at least one channel by contention,
   wherein the second STA satisfies a set of conditions, and
   wherein the set of conditions comprises:
      the second STA has buffer data to be transmitted
      the second STA is in a same basic service set (BSS) as the STA obtaining the at least first channel by contention, and
      a power of a signal received from the STA obtaining the at least first channel by contention is greater than a preset threshold; and
   a receiver coupled to the transmitter and configured to receive response information from an access point (AP), and wherein the response information can be used to schedule the STA to transmit data on a specified sub-channel.

2. The STA according to claim 1, wherein the first RTX, the second RTX, or the third RTX comprises buffer data information and information about the BSS to which the STA or the second STA belongs, wherein the BSS information identifies whether a receiving node is in the same BSS as the STA or the second STA, and wherein the buffer data information comprises a length and a type of data needing to be sent by the STA or the second STA.

3. The STA according to claim 1, wherein the first RTX or the second RTX comprises a STA number and a sub-channel number, wherein the STA number specifies a corresponding follower STA to access a sub-channel, wherein the sub-channel number specifies a sub-channel that the corresponding follower STA accesses, wherein the STA number is in one-to-one correspondence with the sub-channel number, and wherein the follower STA is a STA satisfying the set of conditions.

4. The STA according to claim 1, wherein the first RTX, the second RTX, or the third RTX is sent using orthogonal frequency division multiplexing access (OFDMA) or multi user multiple-input multiple-output (MU-MIMO).

5. The STA according to claim 1, wherein the first RTX or the second RTX further comprises access manner indication information, wherein the access manner indication information instructs a follower STA to perform access using orthogonal frequency division multiplexing access (OFDMA) or uplink multi user multiple-input multiple-output (UL MU-MIMO), and wherein the follower STA is a STA satisfying the set of conditions.

6. The STA according to claim 1, wherein the STA further comprises a processor coupled to the receiver and the transmitter, wherein the first RTX, the second RTX, or the third RTX uses an RTX frame structure, wherein the processor is configured to:
   determine whether a frame length of the first RTX or the third RTX is the same as a preset frame length; and
   enable, using bit stuffing, the frame length of the first RTX or the third RTX to reach the preset frame length when the frame length of the first RTX or the third RTX is less than the preset frame length.

7. The STA according to claim 6, wherein the processor is further configured to select a modulation and coding scheme (MCS) according to the preset frame length.

8. The STA according to claim 1, wherein when the STA obtains the second RTX from the second STA and when the second STA satisfies the set of conditions, the transmitter is further configured to randomly select a sub-channel to transmit the third RTX.

9. An access point (AP), comprising:
   a receiver configured to:
      receive a request to send (RTX) from a master station (STA) in a same basic service set (BSS) as the AP, wherein the master STA is a STA obtaining at least one channel by contention in the BSS; and
      receive an RTX from a follower STA of the master STA,
      wherein the follower STA satisfies conditions as follows:
         the follower STA has buffer data to be transmitted;
         the follower STA is in the same BSS as the master STA, and
         a power of a signal received from the master STA is greater than a preset threshold; and
   a transmitter coupled to the receiver and configured to send response information after RTXs from the master STA and the follower STA of the master STA are received.

10. The AP according to claim 9, wherein the response information uses a clear to send (CTX) frame structure, wherein the response information comprises a STA number and a sub-channel number, wherein the STA number specifies a corresponding STA to access a sub-channel, wherein the sub-channel number specifies a sub-channel that the corresponding STA accesses, and wherein the STA number is in one-to-one correspondence with the sub-channel number.

11. The AP according to claim 9, further comprising a processor coupled to the receiver and the transmitter, wherein the RTXs from the master STA and the follower STA comprise buffer data information, wherein the processor is configured to:
allocate sub-channels to the master STA and the follower STA according to the buffer data information of the master STA and the follower STA; or
allocate sub-channels to the follower STA and the master STA according to a number of a sub-channel on which the follower STA sends the RTX.

12. The AP according to claim 9, wherein the receiver is further configured to receive data from the master STA and the follower STA of the master STA on specified sub-channels, and wherein the transmitter is further configured to send acknowledgement messages to the master STA and the follower STA of the master STA after the data from the master STA and the follower STA of the master STA is received.

13. A data transmission method, comprising:
sending, by a station (STA) obtaining at least one channel by contention in a basic service set (BSS), a request to send (RTX); or
sending the RTX when the STA obtains, by listening, a second RTX from a second STA obtaining at least one channel by contention and the second STA satisfies a set of conditions,
wherein the BSS comprises an access point (AP) and a plurality of STAs,
wherein the set of conditions comprises:
the second STA has buffer data to be transmitted,
the second STA is in a same BSS as a master STA, and
a power of a signal received from the master STA is greater than a preset threshold; and
receiving, by the STA sending the RTX, response information from the AP to transmit data on a sub-channel specified in the response information.

14. The data transmission method according to claim 13, wherein the RTX from the STA comprises buffer data information and information about the BSS to which the STA belongs, wherein the BSS information identifies whether a receiving node is in the same BSS as the STA, and wherein the buffer data information comprises a length and a type of data needing to be sent by the STA.

15. The data transmission method according to claim 13, wherein the RTX from the STA comprises a STA number and a sub-channel number, wherein the STA number specifies a corresponding follower STA to access a sub-channel, wherein the sub-channel number specifies a sub-channel that the corresponding follower STA accesses, wherein the STA number is in one-to-one correspondence with the sub-channel number, and wherein the follower STA is a STA satisfying the set of conditions.

16. The data transmission method according to claim 13, wherein the RTX is sent using orthogonal frequency division multiplexing access (OFDMA) or multi user multiple-input multiple-output (MU-MIMO).

17. The data transmission method according to claim 13, wherein the RTX from the STA further comprises access manner indication information, and wherein the access manner indication information is used to instruct the second STA to perform access using orthogonal frequency division multiplexing access (OFDMA) or uplink multi user multiple-input multiple-output (UL MU-MIMO).

18. A data transmission method, comprising:
receiving a request to send (RTX) from a master station (STA) in a same basic service set (BSS) as an access point (AP),
wherein the master STA is a STA obtaining at least one channel by contention in the BSS;
receiving another RTX from a follower STA of the master STA,
wherein the follower STA satisfies conditions as follows:
the follower STA has buffer data to be transmitted,
the follower STA is in the same BSS as the master STA, and
a power of a signal received from the master STA is greater than a preset threshold; and
sending response information after RTXs from the master STA and the follower STA of the master STA are received.

19. The method according to claim 18, wherein the response information uses a clear to send (CTX) frame structure, wherein the response information comprises a STA number and a sub-channel number, wherein the STA number specifies a corresponding STA to access a sub-channel, wherein the sub-channel number specifies a sub-channel that the corresponding STA accesses, and wherein the STA number is in one-to-one correspondence with the sub-channel number.

20. The method according to claim 18, further comprising:
receiving data from the master STA and the follower STA of the master STA on specified sub-channels; and
sending acknowledgement messages to the master STA and the follower STA of the master STA after the data from the master STA and the follower STA of the master STA is received.

* * * * *